United States Patent Office 3,808,236
Patented Apr. 30, 1974

---

3,808,236
2-NITRO-BENZOFURAN DERIVATIVES
Rene Royer and Loic Rene, Paris, Raymond Cavier, Villejuif, Val de Marne, and Pierre Barbier, Paris, France, assignors to Agence Nationale de Valorisation de la Recherche, Courbevoie, Hauts de Seine, France
No Drawing. Filed Sept. 23, 1970, Ser. No. 74,940
Claims priority, application France, Mar. 24, 1970, 7010537; Aug. 28, 1970, 7031526
Int. Cl. C07d 5/42
U.S. Cl. 260—346.2 R                   11 Claims

ABSTRACT OF THE DISCLOSURE 2-nitro-benzofurans, which may be substituted by halogen or lower alkyl, are effective against microorganisms and parasites.

---

The present invention relates to benzofuran derivatives and to pharmaceutical compositions containing them.

The present invention provides the new benzofuran derivatives of the formula:

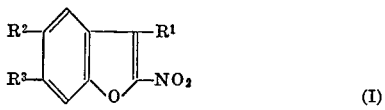

(I)

in which $R^1$ is hydrogen or straight or branched alkyl of up to 6 carbon atoms and each of $R^2$ and $R^3$ is hydrogen, halogen, or straight or branched alkyl of up to 6 carbon atoms, at least one of $R^1$, $R^2$ and $R^3$ being other than hydrogen. These compounds are effective against microorganisms and parasites. Preferred compounds are those of the formula:

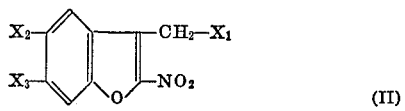

(II)

in which $X_1$, $X_2$ and $X_3$ have the meanings given in the table below

| $X_1$ | $X_2$ | $X_3$ |
|---|---|---|
| H | CH₃ | CH₃ |
| H | H | CH₃ |
| H | Cl | CH₃ |
| H | Br | CH₃ |
| H | Br | H |
| H | Cl | H |
| CH₃ | Cl | H |
| H | F | H |
| H | Br | H |
| CH₃ | CH₃ | CH₃ |

According to the invention, the compounds of Formula I are prepared by direct nitration of the corresponding compounds of formula:

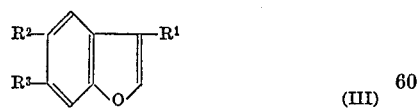

(III)

with concentrated nitric acid in acetic acid.

The examples which follow, in which the temperatures are in degrees centigrade, illustrate the preparation of the new compounds.

EXAMPLE 1

(a) Ethyl (2-acetyl-4,5-dimethylphenoxy) acetate

A mixture of 6-acetyl-1,3,4-xylenol (620 g.), ethyl chloracetate (550 g.) and potassium carbonate (550 g.) in acetone (2 litres) is kept at the boil for 58 hours and then distilled under a pressure of 9 mm. of mercury. The desired ester (785 g., representing a yield of 85% relative to the xylenol) is collected at 201°. After recrystallization from cyclohexane, it forms colorless needles melting at 86°.

Analysis.—Calculated for $C_{14}H_{18}O_4$ (percent): C=67.20; H=7.20. Found (percent): C=66.87; H=7.18.

(b) (2-acetyl-4,5-dimethylphenoxy)acetic acid

After heating the ester (a) for 1 hour at the boil in an aqueous-alcoholic sodium hydroxide solution, the corresponding acid is obtained, which, when recrystallized from ethanol, forms colorless platelets melting at 189°.

Analysis.—Calculated for $C_{12}H_{14}O_4$ (percent): C=64.92; H=6.36. Found (percent): C=65.15; H=6.08.

(c) 3,5,6-trimethyl-benzofuran

A mixture of the acid (b) (600 g.), dry sodium acetate (850 g.) and acetic anhydride (1700 g.) is kept on an oil bath at 170° for 3 hours. The mixture is then poured into water, extracted with benzene, and the extract washed with dilute sodium hydroxide solution and distilled. Under a pressure of 10 mm. of mercury, 3,5,6-trimethylbenzofuran (336 g., representing a yield of 78%) is collected at 113°. When recrystallized from petroleum ether, it gives colorless prisms melting at 41°.

Analysis.—Calculated for $C_{11}H_{12}O$ (percent): C=82.57; H=7.56. Found (percent): C=82.23; H=7.44.

(d) 3,5,6-trimethyl-2-nitro-benzofuran (hereinafter called R 4906)

Nitric acid of density 1.49 is added to a solution of the trimethyl-benzofuran (c) in 10 times its weight of pure acetic acid, at the rate of 1 ml. per gram of compound (c), while the temperature is kept at 20°. The mixture is left for 15 minutes, poured into water and extracted with benzene. The organic phase is carefully washed with water, then with normal sodium hydroxide solution, and then again with water, and the benzene is evaporated. The residue is recrystallized from ethanol. 3,5,6-trimethyl-2-nitro-benzofuran is obtained as platelets melting at 172°.

Analysis.—Calculated for $C_{11}H_{11}NO_3$ (percent): C=64.39; H=5.36; N=6.82. Found (percent): C=64.60; H=5.58; N=6.64.

The NMR spectrum, determined in a solution in deutero-chloroform, using tetramethylsilane as the internal reference, shows the following displacements (in p.p.m.):

CH₃(3) 2.6; CH₃ (5.6) 2.4; H (4.7 ) 7.25 to 7.35

EXAMPLE 2

2-nitro-3-methyl-6-chloro-benzofuran
(hereinafter called R 4857)

The starting material is 3-methyl-6-chloro-benzofuran obtained by cyclization of 2-acetyl-5-chloro-phenoxyacetic acid, itself prepared by the same reaction sequence as acid (b) of Example 1. 3-methyl-6-chlorobenzofuran is obtained in a yield of 85%. It boils at 116°/18 mm.; $n_D^{20}=1.5687$.

It is nitrated as in Example 1, but using nitric acid of density 1.52 and allowing the temperature to rise to 50° at most. 2-nitro-3-methyl-6-chloro-benzofuran is thus obtained and, after crystallization from ethanol, melts at 144°.

*Analysis.*—Calculated for $C_9H_6O_3NCl$ (percent): C=51.12; H=2.86; N=6.62; Cl=16.76. Found (percent): C=50.70; H=2.93; N=6.54; Cl=16.98.

The NMR spectrum confirms the structure indicated.

EXAMPLE 3

2-nitro-3,6-dimethyl-5-chloro-benzofuran (hereinafter referred to as R 4942)

3,6-dimethyl-5-chloro-benzofuran is used as the starting material and the procedure of Example 2 is followed. The 2-nitro-3,6-dimethyl-5-chloro-benzofuran obtained melts at 184° after recrystallization from ethanol.

*Analysis.*—Calculated for $C_9H_8O_3NCl$ (percent): C=53.26; H=3.57; N=6.21; Cl=15.75. Found (percent): C=53.28; H=3.33; N=5.94; Cl=15.51.

The NMR spectrum, determined as in Example 1, showed the following chemical displacements (in p.p.m.):

$CH_3(3)$ 2.65; $CH_3$ (6) 2.55; H (4) 7.65; H (7) 7.4

2-nitro-3,6-dimethyl-5-chloro-benzofuran can also be obtained by nitration of 2,3,6-trimethyl-5-chloro-benzofuran, the yield (16%) being slightly greater than that in the nitration of 3,6-dimethyl-5-chlorobenzofuran.

The compounds defined under (a), (b) and (c) in Example 1, and the 3-methyl-6-chloro-benzofuran of Example 2 are new.

EXAMPLE 4

The intermediate compounds (a), (b) and (c), prepared as in Example 1, have the following characteristics:

(a) Ethyl (2-acetyl-4-bromo-5-methylphenoxy)acetate 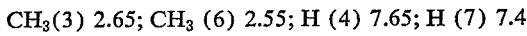

Boiling point=211°/23 mm. Hg; melting point=121°; colorless micro-crystals (from cyclohexane).

*Analysis.*—Calculated for $C_{13}H_{15}O_4Br$ (percent): C=49.57; H=4.80; Br=25:37. Found (percent): C=49.60; H=4.59; Br=25.01.

(b) (2-acetyl-4-bromo-5-methylphenoxy)acetic acid

Melting point=218°. Colorless micro-crystals (from a 50/50 mixture of benzene and ethanol).

*Analysis.*—Calculated for $C_{11}H_{11}O_4Br$ (percent): C=46.03; H=3.86; Br=27.85. Found (percent): C=46.24; H=3.90; Br=28.12.

(c) 3,6-dimethyl-5-bromo-5-benzofuran

Boiling point=149–150°/16 mm. Hg; melting point=39°; colorless needles (from petroleum ether).

*Analysis.*—Calculated for $C_{10}H_9OBr$ (percent): C=53.38; H=4.03; Br=35.52. Found (percent): C=53.51; H=3.87; Br=35.80.

(d) 2-nitro-3,6-dimethyl-5-bromo-benzofuran (hereinafter called R 5214)

7 ml. of nitric acid of density 1.52 are added to a solution of 22 g. of 3,6-dimethyl-5-bromo-benzofuran in 200 ml. of acetic anhydride, while the temperature is kept below 50°. The reaction mixture is left for 10 minutes and then poured into cold water. The crystals formed are separated off and then recrystallized from ethanol. 4 g. (representing a yield of 15%) of glossy golden-yellow needles are obtained, which are 2-nitro-3,6-dimethyl-5-bromo-benzofuran, melting point=171°.

*Analysis.*—Calculated for $C_{10}H_8O_3NBr$ (percent): C=44.48; H=2.99; N=5.19; Br=29.60. Found (percent): C=44.61; H=2.95; N=5.28; Br=29.99.

EXAMPLE 5

The compounds (a), (b) and (c) are prepared as in Example 1.

(a) Ethyl (2-acetyl-4-bromophenoxy)acetate

Boiling point=205°/15 mm. Hg; melting point=41°; colorless micro-crystals (from cyclohexane).

*Analysis.*—Calculated for $C_{12}H_{13}O_4Br$ (percent): C=47.88; H=4.35; Br=26.55. Found (percent): C=48.02; H=4.34; Br=26.12.

(b) (2-acetyl-4-bromophenoxy)acetic acid

Melting point=178°; colorless micro-crystals (from a 50/50 mixture of benzene and ethanol).

*Analysis.*—Calculated for $C_{10}H_9O_4Br$ (percent): C=43.99; H=3.33; Br=29.27. Found (percent): C=50.11; H=3.45; Br=28.99.

(c) 3-methyl-5-bromo-benzofuran

Boiling point=128°/15 mm. Hg; colorless liquid; $n_D^{24°}=1.5928$.

*Analysis.*—Calculated for $C_{10}H_9O_4Br$ (percent): C=51.23; H=3.34; Br=37.87. Found (percent): C=51.05; H=3.48; Br=38.02.

(d) 2-nitro-3-methyl-5-bromo-benzofuran (hereinafter called R 5215)

This is prepared as in Example 1 above, using 20 g. of 3-methyl-5-bromo-benzofuran, 200 ml. of acetic anhydride and 7 ml. of nitric acid. 6.5 g. of the product are obtained, a yield of 27%. Lemon yellow needles (from ethanol); melting point=178°.

*Analysis.*—Calculated for $C_9H_6O_3NBr$ (percent): C=42.22; H=2.36; N=5.47; Br=31.22. Found (percent): C=42.34; H=2.50; N=5.23; Br=31.45.

EXAMPLE 6

3-methyl-5-chloro-benzofuran and its precursors, ethyl (2-acetyl-4-chlorophenoxy)acetate and (2-acetyl-4-chlorophenoxy)acetic acid, are already known; see Newman, Fones and Renoll, J. Amer. Chem. Soc., 1947, 69, 718; for 3-methyl-5-chloro-benzofuran, see Deohra and Gupta, Indian J. Chem., 1964, 2, 459.

2-nitro-3-methyl-5-chloro-benzofuran (hereinafter called R 5216)

This is prepared as in Example 1 above, using 33 g. of 3-methyl-5-chloro-benzofuran, 300 ml. of acetic anhydride and 14 ml. of nitric acid. 12.5 g. of the product are obtained, a yield of 30%. Glossy lemon yellow needles (from ethanol); melting point=158°.

*Analysis.*—Calculated for $C_9H_6O_3NCl$ (percent): C=51.12; H=2.86; N=6.62; Cl=16.76. Found (percent): C=50.96; H=3.01; N=6.75; Cl=16.83.

EXAMPLE 7

(2-propionyl-4-chlorophenoxy)acetic acid is known (Schultz and Sprague, U.S. Pat. No. 3,251,064 of May 10, 1966).

(a) 3-ethyl-5-chloro-benzofuran

Prepared from the preceding acid as in Example 1. Boiling point=128°/15 mm. Hg; colorless liquid; $n_D^{25°}=1.5585$.

*Analysis.*—Calculated for $C_{10}H_9OCl$ (percent): C=66.48; H=4.98; Cl=19.66. Found (percent): C=66.55; H=4.94; Cl=19.70.

(b) 2-nitro-3-ethyl-5-chloro-benzofuran (hereinafter called R 5217)

This is prepared as in Example 4, using 18 g. of 3-ethyl-5-chloro-benzofuran, 180 ml. of acetic anhydride and 7 ml. of nitric acid. 4 g. of the product are obtained, a yield of 18%. Yellow needles; melting point=100°.

*Analysis.*—Calculated for $C_{10}H_8O_3NCl$ (percent): C=53.26; H=3.57; N=6.21; Cl=15.75. Found (percent): C=53.40; H=3.80; N=6.22; Cl=15.99.

EXAMPLE 8

The intermediates (a), (b) and (c) are prepared as in Example 1.

(a) Ethyl (2-acetyl-4-fluorophenoxy)acetate

Boiling point=185–187°/13 mm. Hg; melting point=40°; colorless coarse prisms (from cyclohexane).

*Analysis.*—Calculated for $C_{12}H_{13}O_4F$ (percent): C=60.05; H=5.46; F=7.92. Found (percent): C=59.87; H=5.43; F=8.12.

(b) (2-Acetyl-4-fluorophenoxy)acetic acid

Melting point=113°; colorless micro-crystals (from ethanol).

*Analysis.*—Calculated for $C_{10}H_9O_4F$ (percent): C=56.65; H=4.28; F=8.96. Found (percent): C=56.40; H=4.33; F=9.12.

(c) 3-methyl-5-fluoro-benzofuran

Boiling point=92°/19 mm. Hg; colorless liquid, $n_D^{24°}=1.5280$.

*Analysis.*—Calculated for $C_9H_7OF$ (percent): C=72.06; H=4.70; F=12.67. Found (percent): C=72.05; H=4.82; F=12.62.

(d) 2-nitro-3-methyl-5-fluoro-benzofuran (hereinafter called R 5218)

This is prepared as in Example 4, from 30 g. of 3-methyl-5-fluoro-benzofuran, 300 ml. of acetic anhydride and 14 ml. of nitric acid. 10 g. of product are obtained, a yield of 22.5%. Glossy lemon yellow platelets. Melting point=123° (from ethanol).

*Analysis.*—Calculated for $C_9H_6O_3NF$ (percent): C=55.43; H=3.10; N=7.18; F=9.74. Found (percent): C=55.37; H=3.08; N=7.26; F=9.55.

EXAMPLE 9

2-nitro-3-methyl-6-bromo-benzofuran (hereinafter called R 5233)

The procedure of Example 4 is followed, using 20 g. of 3-methyl-6-bromo-benzofuran (Thakar, J. Indian Chem. Soc., 1963, 49, 539), 200 ml. of acetic anhydride and 7 ml. of nitric acid. 5.4 g. of the product are obtained, a yield of 22.5%. Melting point=148°; pale yellow needles (from ethanol).

*Analysis.*—Calculated for $C_9H_6O_3N$ (percent): C=42.22; H=2.36; N=5.47; Br=31.22. Found (percent): C=42.12; H=2.30; N=5.60; Br=31.17.

EXAMPLE 10

The intermediates (a), (b) and (c) are prepared as in Example 1.

(a) Ethyl (2-propionyl-4,5-dimethylphenoxy)acetate

Boiling point=211°/21 mm. Hg; melting point=57°; colorless needles (from petroleum ether).

*Analysis.*—Calculated for $C_{12}H_{14}O$ (percent): C=68.24; H=7.64. Found (percent): C=68.31; H=7.58.

(b) (2-propionyl-4,5-dimethylphenoxy)acetic acid

Melting point=117°; colorless micro-crystals (from a mixture of cyclohexane and benzene).

*Analysis.*—Calculated for $C_{13}H_{16}O_4$ (percent): C=66.16; H=6.83. Found (percent): C=65.88; H=6.84.

(c) 3-ethyl-5,6-dimethyl-benzofuran

Boiling point=134°/15 mm. Hg; colorless liquid, $n_D^{24°}=1.5458$.

*Analysis.*—Calculated for $C_{12}H_{14}O$ (percent): C=82.83; H=8.11. Found (percent): C=82.72; H=8.10.

(d) 2-nitro-3-ethyl-5,6-dimethyl-benzofuran (hereinafter called R 5238)

This is prepared as in Example 4, using 26.5 g. of 3-ethyl-5,6-dimethyl-benzofuran, 360 ml. of acetic anhydride and 11 ml. of nitric acid. 2.8 g. of product are obtained, a yield of 8.5%. Melting point=118°; yellow platelets (from ethanol).

*Analysis.*—Calculated for $C_{12}H_{13}O_3N$ (percent): C=65.81; H=5.98; N=6.40. Found (percent): C=65.75; H=6.08; N=6.41.

The compounds of Examples 1 to 3 and 2-nitro-benzofuran itself (hereinafter called R 5144) have activities against microorganisms and parasites and are usable as disinfectants and, in therapy, as parasiticides, bactericides, bacteriostatic agents and fungicides.

The anti-microbial activity in vitro has been especially studied for compounds R 4906 and R 5144.

The anti-bacterial activity was evaluated in vitro by determining the minimum inhibitory bacteriostatic concentration (MIC) in a liquid nutrient medium, after 18 hours at 37°. For *Mycobacterum tuberculosis*, the period at 37° was extended to one week.

Three bacterial strains belonging to eight different species were employed.

The culture media were the ordinary nutrient media for the less exacting species, buffered glucose-containing medium for the Streptococcus and the Dubos medium for *M. tuberculosis*.

The anti-mycotic activity was determined first in a solid nutrient medium (Sabouraud agar) for a strain of Aspergillus (*A. fumigatus*) and two strains of dermatophytes (*Microsporum gypseum* and *Trichophyton mentagrophytes*), and secondly, in a liquid nutrient medium (Sabouraud medium) for two strains of fungi (*Candida albicans*). The reading was taken after a period of 72 hours at 28° for the Aspergillus and the dermatophytes and after a period of 18 hours at 37° for the fungi.

The nutrient media were divided between haemolysis tubes at the rate of 1.8 ml. per tube for the bacteria and the fungi and between test tubes of 22 mm. diameter, at the rate of 4.5 ml. per tube, for *M. tuberculosis*.

Solutions of the nitrobenzofuran compounds of decreasing concentrations, prepared by the method of progressive dilutions, were added at the rate of 0.2 ml. to the tubes containing 1.8 ml., and at the rate of 0.5 ml. to the tubes containing 4.5 ml.

The inoculum consisted of a drop of a mother culture which had been aged for 18 hours at 37° in a liquid medium after dilution, until a very slightly cloudy suspension was obtained (about $10^5$ bacteria per ml.).

For the Streptococcus and the Candida, the inoculum was a drop of the mother culture which had been aged for 18 hours without dilution (about $10^8$ bacteria per ml.), and *M. tuberculosis* a drop of a homogeneous culture in Dubos medium.

For the Aspergillus and the dermatophytes, the solutions of the products tested were added to the Sabouraud agar at the rate of 2 ml. of solution per 18 ml. of liquefied agar, before being poured into a Petri dish. The inoculum consisted of a small fragment of a 72 hours old culture.

The final concentrations of the substances tested are low, taking into account their very low solubility. Their solution in acetone is diluted with water so as not to exceed a final concentration of acetone in the nutrient medium of 1/20 for the bacteria and the fungi and of 1/40 for *M. tuberculosis*, these concentrations being compatible with the normal growth of the microorganisms.

The results obtained for compounds R 4906 and R 5144 are shown in Table 1 below. They are expressed as the minimum inhibitory concentration (MIC) in micrograms per millilitre of nutrient medium.

TABLE I

| | R 4906 | R 5144 |
|---|---|---|
| Bacteria: | | |
| Escherichia coli 17 | 5 | 10 |
| Escherichia coli 32 | 5 | 25 |
| Rettgerella 3 | >5 | 100 |
| Salmonella typhimurium 178 | >5 | 25 |
| Pseudomonas aeruginosa 34 | >5 | >100 |
| Pseudomonas aeruginosa 181 | >5 | >100 |
| Streptococcus foecalis 35 | >5 | >100 |
| Streptococcus foecalis 56 | >5 | >100 |
| Streptococcus pyogenes 91 | >5 | >100 |
| Streptococcus pyogenes 96 | >5 | >100 |
| Staphylococcus aureus 19 | >5 | >100 |
| Staphylococcus aureus 153 | >5 | 100 |
| Mycobacteruim tuberculosis | 2.5 | 2.5 |
| Fungi: | | |
| Aspergillus fumigatus | >2.5 | 25 |
| Microsporum gypseum | >2.5 | 10 |
| Trichophyton mentagrophytes | >2.5 | 10 |
| Candida albicans 1 | >5 | >100 |
| Candida albicans 2 | >5 | 25 |

Three types of effects were investigated in parasitology.

(1) Oxyuricidal action

The evaluation of anthelminthic properties was carried out in vivo in mice experimentally infected with *Syphacia obvelata* (a threadworm).

Five to six weeks old mice are infected by contact with mice heavily infected by *Syphacia obvelata* parasites. To achieve this, twenty new mice and four or five mice infected with parasites are put together in a crystallizing dish. The animals are left in contact for five days. From the 8th to 11th day following the start of the infection, that is to say for four days, the mice are given the product to be tested, as a solution or suspension in a volume of water not exceeding 0.25 ml., administered orally once per day.

Autopsy is carried out on the thirteenth day, that is to say 48 hours after stopping the treatment. The live threadworms in the large intestine are then examined, not counting young larvae of maximum length of 0.5 mm., the possible presence of which may be evidence of a re-infection subsequent to the start of the treatment.

Batches of at least ten animals are used and for each substance the percentage of mice completely free of their parasites is determined; the dose administered is uniformly 200 mg./kg. of body weight daily. For each series of experiments, ten to twenty comparison mice which did not receive any treatment are kept.

(2) Trichomonacidal action

The determination of the trichomonacidal activity in vitro on *Trichomonas vaginalis* is carried out in accordance with two methods:

(a) Inhibition at the start of the cultures: The culture medium (so-called Magara medium) consists of a commercial broth of beef meat and liver (VF broth or Weinberg and Goy medium, provided by the Institut Pasteur) for anaerobic organisms, with the addition of 0.5% of glucose and of 5 to 10% of sterile colt serum. 9 ml. of this medium are inoculated with 0.5 ml. of a culture of *Trichomonas vaginalis* corresponding to 400,000 flagellae, and are treated at the same time with 0.5 ml. of an aqueous solution or suspension of the compound to be examined. The activity found is given by the minimum concentration of substance which totally inhibits the development of the *Trichomonas vaginalis* after a contact time of 48 hours in an oven at 37°.

(b) Lethal effect on a two day old culture: In this test, the smallest quantity of compound to be examined which kills all the flagellae of a two day old culture after a contact time of 48 hours in an oven at 37° is determined.

In both cases, the presence or absence of Trichomonas, and where appropriate their appearance and their mobility, in the culture tubes is examined at the end of the experiment. If the flagellae are absent or immobile, the experiment is completed by carrying out a subculture.

(3) Amoebicidal action

The tests of the amoebicidal activity in vitro against *Entamoeba dysenteriae* were carried out in the same manner as the experiments against *Trichomonas vaginalis*, but the medium used is the Pavlova-Jones medium, the composition of which is given below:

| | G. |
|---|---|
| $Na_2HPO_4 \cdot 2H_2O$ | 4.45 |
| $K_2HPO_4$ | 1.135 |
| NaCl | 20 |
| Difco yeast extract | 2.75 |

Distilled water, 2,750 ml.

The inhibiting action at the start of the culture is recorded after 72 hours in an oven at 37°. To determine the lethal effect, a two day old culture of amoebae is used, a reading being taken after 48 hours in an oven at 37°. As in the experiment with *Trichomonas vaginalis*, a subculture is carried out if this is necessary.

The results are given in Table II below.

TABLE II

| | T. vaginalis | | Entamoeba dysenteriae | | Syphacia obvelata | | |
|---|---|---|---|---|---|---|---|
| | | | | | Mice | | |
| | | | | | Freed of parasites | | |
| Compound number | Initial inhibition | Lethal effect in 48 hours | Initial inhibition | Lethal effect in 48 hours | Number | Percent | Dead |
| R 4906 | [1] 0.6 | | [2] 2.5 | | 27/28 | 96.4 | 2/30 |
| R 4857 | 10 | 0 | 50–100 | 0 | 24/28 | 85.7 | 2/30 |
| R 4942 | 2.5 | 0 | 50–100 | 0 | 6/9 | 66.6 | 1/10 |

[1] Slight effect at 0.3.
[2] Slight effect at 1.25.

Supplementary experiments with R 4906 on *Syphacia obvelata* gave the following results: 200 mg./kg. as a single dose: of 20 animals, 100% are freed of parasites. 100 mg./kg. as a single dose: of 20 animals, 90% are freed of parasites.

Supplementary experiments with R 4906 and R 5144 on various strains of Trichomonas at 37° for 48 hours gave the following results for the parasiticidal activity.

| Strain | R 4906 | R 5144 |
|---|---|---|
| Beligon | 1 | 1 |
| Fournier | 0.25 | 0.1 |
| Theodas | 1 | 0.5 |

The biological activities of the compounds of Examples 4 to 10, determined as indicated above, are as follows:

Actions against *Trichomonas vaginalis*:
R 5214: 10 μg./ml.
R 5215: 10 μg./ml.
R 5216: 10 μg./ml.
R 5217: 10 μg./ml.
R 5218: 10 μg./ml.
R 5233: 10 μg./ml.
R 5238: 1.25 μg./ml.

Actions against *Entamoeba dysenteriae*:
R 5214: from 1 to 10 μg./ml.
R 5215: from 10 to 100 μg./ml.
R 5216: 100 μg./ml.
R 5217: 100 μg./ml.
R 5218: 100 μg./ml.
R 5233: from 10 to 100 μg./ml.
R 5238: 10 μg./ml.

Actions against *Syphacia obvelata*:
R 5214: 100% of mice freed of parasites
R 5215: 100%
R 5216: 100%
R 5217: 100%
R 5218: 100%
R 5233: 100%
R 5238: 80%

The compounds R 4906 and R 5144, the first being the preferred compound, can be used in therapy for the treatment of urethritis and vaginitis caused by Trichomonas, and of intestinal or hepatic amoebiasis. They can also be employed to combat pathogenic colibacilli, and in the treatment of infections of the skin, nails and scalp by dermatophytes, as well as against tuberculosis. Finally, compound R 4906 can be used against threadworms. The compounds can for example be in the form of tablets which contain from 5 to 800 mg., or of pills or of an ointment.

The compounds R 4857 and R 4942 can be used in the treatment of Trichomonas complaints; they can in particular be in the form of tablets or pills.

The compounds of Examples 4 to 10 can also be used in human therapy and in veterinary therapy, especially for combating threadworms.

The invention therefore includes within its scope pharmaceutical compositions comprising in association with a significant amount of a pharmaceutically acceptable and compatible carrier a compound of the formula:

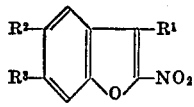

in which $R^1$ is hydrogen or alkyl of 1 to 6 carbon atoms and each of $R^2$ and $R^3$ is hydrogen, halogen or alkyl of 1 to 6 carbon atoms.

We claim:
1. A benzofuran of the forumla:

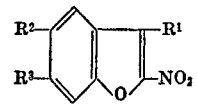

wherein $R^1$ is selected from the group consisting of methyl and ethyl and each of $R^2$ and $R^3$ are selected from the group consisting of hydrogen, methyl, chlorine, fluorine and bromine.
2. 2-nitro-3,5,6-trimethyl-benzofuran.
3. 2-nitro-3-methyl-6-chloro-benzofuran.
4. 2-nitro-5-chloro-3,6-dimethyl-benzofuran.
5. 2-nitro-3,6-dimethyl-5-bromo-benzofuran.
6. 2-nitro-3-methyl-5-bromo-benzofuran.
7. 2-nitro-3-methyl-5-chloro-benzofuran.
8. 2-nitro-3-ethyl-5-chloro-benzofuran.
9. 2-nitro-3-methyl-5-fluoro-benzofuran.
10. 2-nitro-3-methyl-6-bromo-benzofuran.
11. 2-nitro-3-ethyl-5,6-dimethyl-benzofuran.

References Cited
UNITED STATES PATENTS 3,577,441  5/1971  Kaminsky et al. ____ 260—346.2

OTHER REFERENCES

Royer et al.: Bulletin de la Societé Chimique de France, March 1970, No. 3, pp. 1029–1036.

Cavier et al.: Chem. Abstracts, 1969, vol. 70, 113686.

Stoermer et al.: Berichte, 1897, vol. 30, pp. 2094–6.

NICHOLAS S. RIZZO, Primary Examiner

B. DENTZ, Assistant Examiner

U.S. Cl. X.R.

424—285